United States Patent [19]

Sato

[11] 4,285,020
[45] Aug. 18, 1981

[54] TAPE CASSETTE

[75] Inventor: Masaaki Sato, Hachioji, Japan

[73] Assignee: Olympus Optical Company, Ltd., Tokyo, Japan

[21] Appl. No.: 113,657

[22] Filed: Jan. 21, 1980

[30] Foreign Application Priority Data

Mar. 24, 1979 [JP] Japan .................................. 54/38431

[51] Int. Cl.³ .............................................. G11B 23/08
[52] U.S. Cl. .................................................... 360/132
[58] Field of Search ........................................ 360/132

[56] References Cited

U.S. PATENT DOCUMENTS

| 3,666,203 | 5/1972 | Sato et al. | 360/132 |
| 3,796,394 | 3/1974 | Souza | 360/132 |

Primary Examiner—Robert S. Tupper
Attorney, Agent, or Firm—Weinstein & Sutton

[57] ABSTRACT

A tape cassette includes a magnetic tape having a magnetizable surface which is formed by a thin metal film. The cassette includes a ground connection therein to bear against a member of a magnetic recording and reproducing apparatus which represents a ground potential thereof when the cassette is loaded on the latter to discharge any electrostatic charge which may be formed on the magnetizable surface.

11 Claims, 8 Drawing Figures

TAPE CASSETTE

BACKGROUND OF THE INVENTION

The invention relates to a tape cassette, and more particularly, to a tape cassette utilizing a magnetic tape having a magnetizable surface formed by a thin metal film in which an arrangement is made to prevent the tape from being charged.

A variety of new kind of magnetic tapes, commonly referred to as metallic tapes, are proposed for use in a magnetic recording and reproducing apparatus such as a tape recorder, a video tape recorder (VTR) or the like in order to achieve high recording density. As one example, a thin metal film may be formed on a plastic film base by a sputtering of cobalt-chromium (Co-Cr) for use as a magetizable surface of magnetic tape. Such tape is already in use. Similarly, a magnetic tape having a magnetizable surface formed by an evaporated magnetic film of a cobalt alloy is also appearing on the market.

Since such a thin metal film which forms the magnetizable surface of such magnetic tape represents a good conductor, a triboelectricity which is developed as the magnetic tape is being fed by the apparatus does not remain in the place of their original occurrence, but will be distributed along the full length of the tape. If the magnetic tape which is electrostatically charged in this manner obtains a high electric potential, there will be produced an electric discharge between the magnetizable surface and any metallic member which is located adjacent to the tape, causing a crackling.

It is generally recognized that a tape cassette which contains a length of magnetic tape comprises a pair of upper and lower cassette halves which are molded from a plastic material with the opposite ends of the tape being secured to left- and right-hand hubs and wound thereon. The front side of the cassette is formed with slots or windows into which a magnetic head, a pinch roller or the like may move and along which the tape runs in contact with tape guide pins, tape guide rollers or tape pads while being maintained in taut condition. A path for the discharge of the electrostatic charge which is produced by the triboelectric effect of the magnetic tape is located on the part of the recording and reproducing apparatus on which the cassette is mounted, and may include the pinch roller, the capstan and the magnetic head. However, the pinch roller usually comprises an insulating material such as rubber, and hence cannot form a discharge path for the charge. Also, the capstan is disposed in abutment against the nonmagnetic surface of the magnetic tape, again preventing a discharge of the charge to the capstan. A magnetic head which comprises a ferrite material has no electrical conductivity, while a magnetic head which comprises a permalloy material is coated by an electrically nonconductive resin, both preventing a discharge of the electrostatic charge to the head itself. However, a magnetic head is housed in a shielded metal casing which is usually provided with an integral tape guide. Hence, the electrostatic charge on the tape will be discharged to the tape guide.

The electrostatic charge can be discharged to the tape guide without any problem whatsoever if a reliable contact is maintained between the tape and the guide. However, a bouncing in the movement of the tape as it is being fed may cause an irregular and repeated contact between the tape and the tape guide, thereby giving rise to a crackling during the discharge process which may be picked up by the head and reproduced as noise.

SUMMARY OF THE INVENTION

It is an object of the invention to eliminate the above mentioned difficulty of the prior art by providing a tape cassette housing a magnetic tape having a magnetizable surface formed by a thin metal film and including a ground connection member which is maintained in abutment against the magnetizable surface to allow a discharge of any electrostatic charge formed thereon through the ground connection member to a magnetic recording and reproducing apparatus whenever the cassette is mounted on the latter.

In accordance with the invention, the provision of a ground connection member allows any electrostatic charge which may be formed on the thin metal film which constitutes the magnetizable layer of the magnetic tape, to be discharged throughout the time the tape cassette is in use, and thus prevents noises from occurring as a result of an irregular discharge of such charge.

It will be appreciated that no special means is required on the part of an associated magnetic recording and reproducing apparatus to accommodate the tape cassette since the mere provision of the ground connection member on the tape cassette which is adapted to engage and contact the earth of the apparatus provides the required ground connection. Hence, the magnetic tape cassette of the invention is directly usable with any conventional magnetic recording and reproducing apparatus.

DESCRIPTION OF PREFERRED EMBODIMENTS

Figure 1:
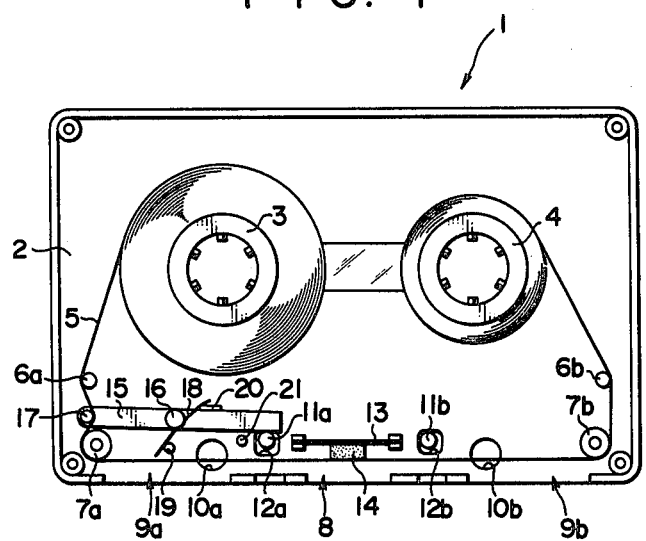
FIG. 1 is a schematic plan view of a tape cassette according to one embodiment of the invention, with an upper cassette half being removed.

Referring to FIG. 1, there is shown a tape cassette according to one embodiment of the invention in plan view, with an upper cassette half being removed. The tape cassette 1 shown is of a so-called compact type, and is constructed in a manner similar to a conventional one except that an electrically conductive lever 15 is disposed therein to serve as a discharge or ground connection member. Specifically, the tape cassette 1 comprises an upper (not shown) and a lower cassette half 2 disposed in aligned and abutting relationship to define a housing therefor. At locations substantially aligned with a centerline and symmetrically spaced from the center of the cassette 1 lengthwise thereof, both cassette halves are formed with bores (not shown) in which tape hubs 3, 4 are rotatably disposed. A length of magnetic tape 5 has its opposite ends anchored to the tape hubs 3, 4, and is wound about hubs 3 and 4 in the manner as shown. The tape 5 extends along the front side of the cassette 1 in taut condition which is maintained by passing it around tape guide pins 6a, 6b and tape guide rollers 7a, 7b. The tape 5 comprises a film base of a plastic material on one surface of which is formed a magnetizable layer in the form of a thin metal film formed as by coating, evaporation or sputtering. The tape 5 is disposed so that the magnetizable layer is located for abutment against a magnetic head (not shown) and a pinch roller (not shown). The front wall of the tape cassette 1 is formed with slot or window 8 into which the magnetic head (not shown) of a magnetic recording and reproducing apparatus is movable as well as windows 9a, 9b into which pinch rollers (not shown) are movable. Toward the front wall of the tape cassette 1, the upper and lower cassette halves are formed with openings 10a, 10b and cassette positioning apertures 12a, 12b which are engaged by capstans (not shown) and cassette positioning pins 11a, 11b, respectively, of the magnetic recording and reproducing apparatus. A tape pad 14 is disposed adjacent to the central portion of the front wall of the tape cassette 1 for abutment against the film base side of the magnetic tape 5, and is supported by a leaf spring 13 which is mounted on one of the cassette halves.

Figure 2:
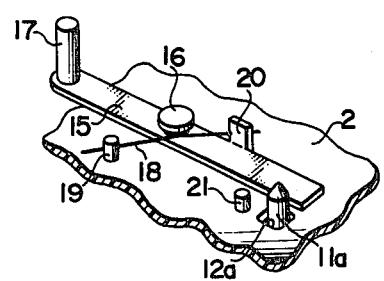
FIG. 2 is a perspective view of a ground connection member used in the cassette of FIG. 1.

In accordance with the invention, a conductive lever 15 is pivotally mounted on a pin 16 adjacent to the front side and toward the left-hand side of the tape cassette 1 to serve as a discharge or ground connection member. One arm of the conductive lever 15 extends to a position intermediate the left-hand tape guide pin 6a and tape guide roller 7a with a contacting pin 17 fixedly mounted on the free end thereof to serve as a conductive contact which bears against the magnetizable surface of the magnetic tape 5. As shown in FIG. 2, a torsion spring 18 is disposed on the pin 16 and has its one end engaged with a spring abutment pin 19 fixedly mounted on the cassette half 2 and its other end engaged with another spring abutment piece 20 which is formed as an upstanding piece from the other arm of the conductive lever 15 for urging the lever 15 to turn clockwise. The resulting movement of the lever 15 is limited by its abutment against a stop pin 21 which is fixedly mounted on the cassette half 2 when the cassette 1 is not mounted on the recording and reproducing apparatus. However, when the cassette 1 is mounted on such apparatus, the free end of the cassette positioning pin 11a, which is provided with a tapered surface, rocks the conductive lever 15 slightly counter-clockwise as it is advanced into the cassette positioning aperture 12a. Both of the cassette positioning pins 11a, 11b are formed of a conductive metal material and are mechanically secured to a metallic body such as the chassis of the apparatus, thus representing a ground connection thereof.

In use, when the tape cassette 1 is mounted on the recording and reproducing apparatus, the metallic, cassette positioning pins 11a and 11b which project into the cassette receiving chamber of the apparatus engage the cassette positioning apertures 12a and 12b to load the cassette 1 in place within the apparatus, with the tapered surface on the free end of the pin 11a causing the conductive lever 15 to turn counter-clockwise slightly while maintaining contact between the lever 15 and the pin 11a. Under this condition, the contacting pin 17 fixedly mounted on one end of the conductive lever 15 is brought into a positive abutment against the magnetizable surface of the magnetic tape 5. Since its other end engages the pin 11a, there is completed an electrical discharge path for any electrostatic charge on the magnetizable surface of the tape 5 including contacting pin 17, conductive lever 15, cassette positioning pin 11a and the chassis of the apparatus. Since that portion of the magnetic tape 5 which moves past the magnetic head does not have an electrostatic charge, no crackling is produced if the tape 5 moves away from and back into contact with the metallic tape guides, preventing a recording of noises on the magnetic tape.

Figure 3:
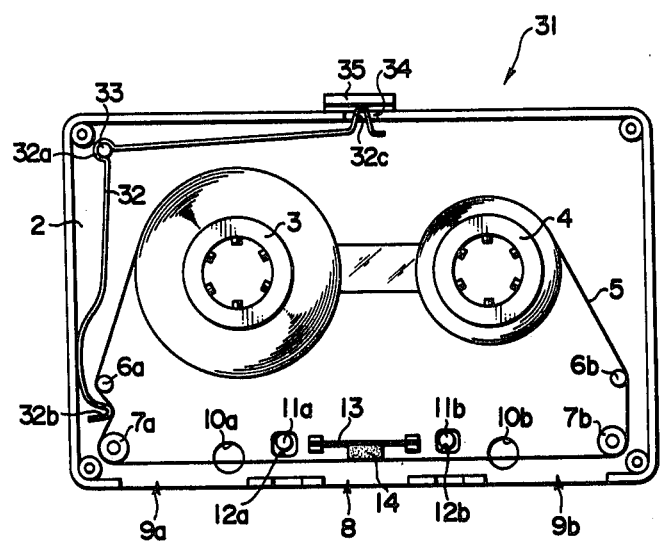
FIG. 3 is a schematic plan view of a tape cassette according to another embodiment of the invention, with an upper cassette half being removed.
Figure 4:
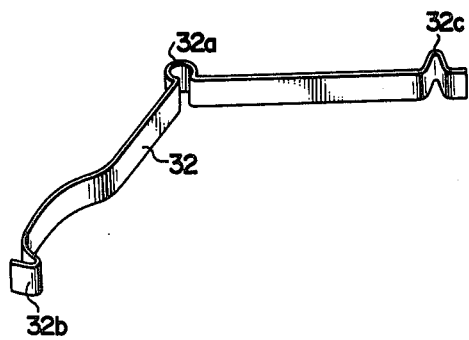
FIG. 4 is a perspective view of a ground connection member used in the cassette of FIG. 3.

FIG. 3 shows another embodiment of the invention in which a tape cassette 31 is provided with an electrically conductive leaf spring 32 which serves as a discharge, ground connection member. Referring to FIGS. 3 and 4, the leaf spring 32 comprises a resilient metal strip which is folded into an inverted L-configuration having a central bend 32a which is shaped into a cylindrical form. The cylindrical bend 32a is fitted over a stationary pin 33 which is fixedly mounted on the cassette half 2 toward its left-hand, rear corner. The leaf spring 32 has one arm which extends forwardly toward the front side of the cassette 31, with its free end being folded to define a V-configuration which projects to the right. The apex of the V-configuration is disposed in abutment against the magnetizable surface of the magnetic tape 5 which extends in taut condition across the guide pin 6a and the guide roller 7a, thus providing a contact 32b which is in electrical contact with the magnetizable surface. The other arm of the leaf spring 32 extends along the rear wall of the tape cassette 31, and its free end is folded to define an inverted V-configuration. The apex of the inverted V-configuration provides a contact 32c which projects through a square opening 34 formed centrally in the rear wall of the cassette 31. By its own resilience, the contact 32c is adapted to bear against a cassette retaining leaf spring 35 which is disposed within the cassette receiving chamber of the apparatus when the cassette 31 is loaded therein. The leaf spring 35 is formed of a resilient metal material and is secured to a metal chassis of the apparatus or the like as by set screw, whereby it is connected with the electrical ground of the apparatus.

In other respects, parts shown in FIG. 3 are similar to those shown in FIG. 1, and hence corresponding parts are designated by like reference characters without repeating their description.

In use, when the cassette 31 is loaded into the recording and reproducing apparatus, the contact 32c formed on the leaf spring 32 bears against the cassette retaining leaf spring 35 which is provided in the apparatus for abutment against the rear side of the cassette 31, thereby providing a discharge path from the magnetizable surface of the magnetic tape 5 to the chassis of the apparatus including the leaf springs 32, 35. Accordingly, any electrostatic charge which may be formed on the magnetizable surface of the tape 5 by the triboelectric effect as the tape 5 is being fed, can be discharged to the apparatus through the discharge path, preventing a spark from being produced across the tape 5 and tape guides 6a and 7a.

Figure 5:
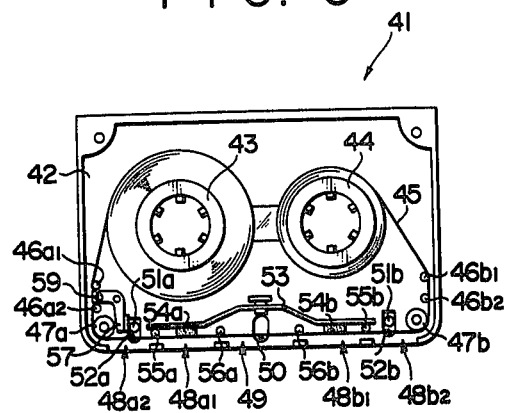
FIG. 5 is a schematic plan view of a tape cassette according to a further embodiment of the invention, with an upper cassette half being removed.

FIG. 5 shows a further embodiment of the invention which is applied to a micro-cassette (trademark of the applicant). A tape cassette 41 shown has a size which is one quarter the size of the above described compact cassette, and is constructed in generally the same manner as the latter. It includes an upper cassette half (not shown) and a lower cassette half 42, which are disposed in aligned and abutting relationship to define a housing therefor. Both cassette halves are formed with bores which are aligned with the lengthwise centerline thereof and spaced apart therealong and in which a pair of tape hubs 43, 44 are rotatably disposed. A length of magnetic tape 45 has its opposite ends anchored to the respective tape hubs 43, 44 with a respective tape roll formed thereon. The magnetic tape 45 is passed around tape guide pins 46a1, 46a2, 46b1, 46b2, 56a, 56b and tape guide rollers 47a, 47b, whereby it extends in taut condition along the front side of the tape cassette 41. It should be understood that the magnetic tape 45 again comprises a magnetizable surface in the form of a thin metal film which is applied to one surface of a film base of a plastic material as by coating, evaporation or sputtering, with the magnetizable surface disposed for abutment against a magnetic head.

Formed in the front wall of the tape cassette 41 are windows 48a1, 48b1 into which a record/playback head (not shown) of the apparatus is movable, windows 48a2, 48b2 into which an erase head (not shown) is movable, as well as a window 49 into which a pinch roller (not shown) is movable. Toward the front wall of the cassette 41, the cassette half 42 is centrally formed with an opening 50 for receiving the capstan (not shown), and with a pair of cassette positioning apertures 52a, 52b on the opposite sides of the opening 50 which receive cassette positioning pins 51a, 51b. Adjacent to the front wall of the cassette 41, a leaf spring 53 is fixedly mounted on the cassette half 42 and fixedly carries tape pads 54a, 54b toward its opposite ends which are adapted to bear against the film base of the magnetic tape 45. It is to be noted that the resilience of the leaf spring 53 is adjusted by abutment of its opposite ends against detent pins 55a, 55b, which serve as tape guides for the tape portion extending along the front wall, together with tape guide pins 56a, 56b which are disposed on opposite sides of the opening 50.

Figure 6:
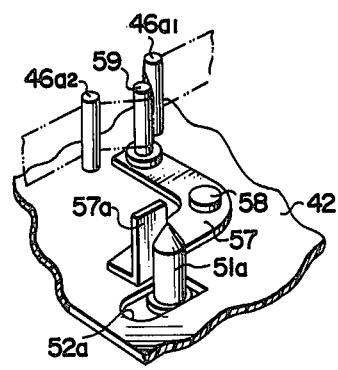
FIG. 6 is an enlarged perspective view of a ground connection member used in the cassette of FIG. 5.

In accordance with the invention, a conductive lever 57 having an inverted L-configuration is pivotally mounted on a pin 58 (see FIG. 6) which is fixedly mounted on the cassette half 42 toward the left-hand, front corner of the tape cassette 41. The purpose of the lever 57 is to provide a discharge, ground connection member. The lever 57 has one arm which extends into a space between the left-hand tape guide pins 46a1, 46a2, with a contacting pin 59 fixedly mounted on the free end thereof to serve as a conductive contact. The contacting pin 59 is adapted to bear against the opposite surface from the film base, namely, the magnetizable surface of the magnetic tape 45. The other arm of the conductive lever 57 extends to the left-hand side of the positioning aperture 52a, with a contact 57a upstanding from the right-hand edge of this arm at its free end for engagement with the positioning pin 51a which is adapted to fit in the aperture 52a. The tension in the tape 45 as it is being fed provides sufficient pressure to maintain the contact 57a in abutment against the positioning pin 51a.

In use, when the tape cassette 41 is loaded into the recording and reproducing apparatus, the metallic, cassette positioning pin 51a which projects into the cassette receiving chamber moves into the cassette positioning aperture 52a to engage the contact 57a on the conductive lever 57. Although the conductive lever 57 is urged in no way and hence remains free when the apparatus is inoperative, the tension in the magnetic tape 45 causes the conductive lever 57 to rock in a direction to bring the contact 57a into abutment against the pin 51a to thereby maintain reliable contact therebetween whenever the apparatus is operative. Consequently, any electrostatic charge which may be formed on the tape 45 as it is being fed can be discharged to the apparatus through the lever 57 and pin 51a, thereby avoiding any spark and hence crackling between the head and the tape guide.

Figure 7:
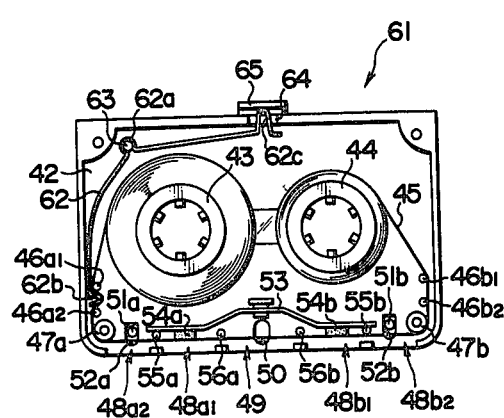
FIG. 7 is a schematic plan view of a tape cassette according to still another embodiment of the invention, again removing an upper cassette half thereof.

FIG. 7 shows still another embodiment of the invention in which a tape cassette 61 is provided with a conductive leaf spring 62 in the same manner as the tape cassette 31 shown in FIG. 3. The leaf spring 62 comprises a resilient metal strip which is folded into an inverted L-configuration and having a central, cylindrical bend 62a which is fitted over a stationary pin 63 fixedly mounted on the cassette half 42 toward the left-hand rear corner thereof, generally in the same manner as shown in FIG. 3. As before, one end of the leaf spring 62 is formed with a V-shaped contact 62b for engagement with the magnetizable surface of magnetic tape 45 while the other end is formed with a contact 62c having an inverted V-configuration which projects through an opening 64, formed centrally in the rear wall of the cassette 61, to bear against a cassette retaining leaf spring 65 of the apparatus.

In other respects, the tape cassette 61 is similar to the tape cassette 41 shown in FIG. 5 and hence corresponding parts are designated by like reference characters without repeating their description.

It will be understood that the tape cassette 61 thus constructed achieves the same effect and functioning as those achieved by the tape cassette 31 of FIG. 3.

Although a single discharge, ground connection member has been provided within the tape cassette of the individual embodiments described above, it should be apparent that a pair of such members may be disposed along the opposite sides of the tape cassette, for example. When so constructed, while contact between one of the conductive levers and the cassette guide pin may be interrupted depending on the direction in which the magnetic tape is being fed, as might be experienced with the arrangements shown in FIGS. 1 and 5, a contact is maintained between the other conductive lever and the cassette guide pin, thus assuring a reliable connection of the magnetizable surface of the magnetic tape with the ground.

Figure 8:
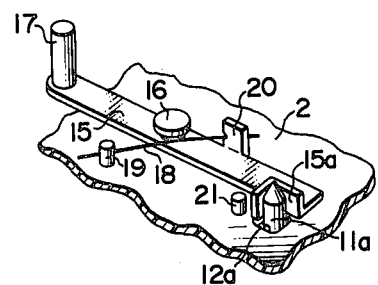
FIG. 8 is a perspective view of a modification of the ground connection member shown in FIG. 2.

Instead of providing a pair of ground connection members along the both lateral sides of the tape cassette, the embodiment shown in FIG. 1 may be modified by providing an upstanding piece 15a having an inverted L-configuration on the conductive lever in a region where it bears against the positioning pin 11a, as indicated in FIG. 8. In a corresponding manner, the embodiment shown in FIG. 5 may be modified by providing the conductive lever 57 with an upstanding piece having an inverted L-configuration similar to that shown in FIG. 8 to provide a conductive contact. In this manner, it is assured that either one of the upstanding pieces is reliably maintained in abutment against the cassette positioning pin regardless of the direction in which the magnetic tape is fed, thus enhancing the reliability that the magnetizable surface of the magnetic tape be connected with the ground.

What is claimed is:

1. A tape cassette containing a magnetic tape having a magnetizable surface which is formed by a thin metal film; characterized by the provision of a discharge, ground connection member disposed within the cassette and having a conductive contact disposed for abutment against the magnetizable surface of the magnetic tape, said ground connection member being brought into electrical contact with a member of a magnetic recording and reproducing apparatus which represents the ground potential thereof whenever the cassette is loaded on the magnetic recording and reproducing apparatus.

2. A tape cassette according to claim 1 in which said ground connection member comprises a rockable conductive lever having a pair of aims and fixedly carrying a contacting pin on the end of one arm of said lever to serve as said conductive contact, the end of the other arm of said lever being disposed for engagement with a cassette positioning pin which is provided within the apparatus and representing a ground potential thereof.

3. A tape cassette according to claim 2 in which said conductive lever is resiliently urged in a direction to cause the end of said other arm to bear against said cassette positioning pin.

4. A tape cassette according to claim 2 in which said conductive lever is urged by the tension in the tape when the tape is being fed to bring the end of said other arm into abutment against said cassette positioning pin.

5. A tape cassette according to claim 1 in which said discharge, ground connection member comprises an electrically conductive leaf spring which is formed with a first folded contact at one end of said leaf spring to serve as said conductive contact and which is formed with a second folded contact at the other end of said leaf spring, said magnetic recording and reproducing apparatus including a retaining leaf spring, said second folded contact extending through an opening formed in a rear wall of the tape cassette to bear against said cassette retaining leaf spring provided on the part of the apparatus and representing a ground potential thereof.

6. A tape cassette according to claim 1 further including a tape guide pin and a tape guide roller spaced apart from said tape guide pin, said conductive contact bearing against the magnetizable surface of a portion of the magnetic tape which extends in taut condition across said tape guide pin and said tape guide roller.

7. A tape cassette according to claim 1 further including a pair of spaced apart tape guide pins, said conductive contact bearing against the magnetizable surface of a portion of the magnetic tape which extends in taut condition across said pair of tape guide pins.

8. A tape cassette according to claim 1 in which a pair of said discharge, ground connection member are located laterally spaced apart within the tape cassette.

9. The tape cassette according to claim 1 in which the portion of the ground connection member brought into electrical contact with a member of the magnetic recording and reproducing apparatus has an L-shaped surface for engaging the said member.

10. A tape cassette according to claim 2 comprising spring means for urging said conductive lever in a direction to maintain good electrical contact between said conductive level and said cassette positioning pin.

11. A tape cassette according to claim 6 wherein said conductive contact urges the magnetic tape to extend into the region between said guide pin and said tape guide roller.

* * * * *

UNITED STATES PATENT AND TRADEMARK OFFICE
CERTIFICATE OF CORRECTION

PATENT NO. : 4,285,020
DATED : August 18, 1981
INVENTOR(S) : Masaaki Sato

It is certified that error appears in the above—identified patent and that said Letters Patent is hereby corrected as shown below:

In the abstract, line 6, change "latter" to --magnetic recording and reproducing apparatus--.

Claim 2, column 7, line 15, change "aims" to --arms--.

Signed and Sealed this

First Day of June 1982

|SEAL|

Attest:

Attesting Officer

GERALD J. MOSSINGHOFF

Commissioner of Patents and Trademarks